United States Patent
Schalberger et al.

(10) Patent No.: US 8,983,240 B2
(45) Date of Patent: Mar. 17, 2015

(54) ELECTRO-OPTICAL PHASE MODULATOR WITH AN OPTICALLY ISOTROPIC MATERIAL WHICH BECOMES OPTICALLY ANISOTROPIC UNDER AN ELECTRIC FIELD

(71) Applicant: Universitaet Stuttgart, Stuttgart (DE)

(72) Inventors: Patrick Schalberger, Stuttgart (DE); Norbert Fruehauf, Sindelfingen (DE)

(73) Assignee: Universitaet Stuttgart, Stuttgart (DE)

( * ) Notice: Subject to any disclaimer, the term of this patent is extended or adjusted under 35 U.S.C. 154(b) by 275 days.

(21) Appl. No.: 13/645,394

(22) Filed: Oct. 4, 2012

(65) Prior Publication Data
US 2013/0148921 A1   Jun. 13, 2013

(30) Foreign Application Priority Data
Dec. 8, 2011   (DE) .......................... 10 2011 056 166

(51) Int. Cl.
G02F 1/035   (2006.01)

(52) U.S. Cl.
USPC ............................................................. 385/3

(58) Field of Classification Search
USPC ............ 385/3, 4, 5, 10–12, 14; 349/141, 129, 349/130, 132, 145, 167; 359/233, 198, 290
See application file for complete search history.

(56) References Cited

U.S. PATENT DOCUMENTS

| | | | |
|---|---|---|---|
| 4,767,194 A * | 8/1988 | Heppke et al. | 349/167 |
| 5,132,823 A * | 7/1992 | Kamath et al. | 349/113 |
| 6,215,577 B1 | 4/2001 | Koehl et al. | |
| 6,587,162 B1 * | 7/2003 | Kaneko et al. | 349/43 |
| 7,304,786 B2 * | 12/2007 | Hagood et al. | 359/290 |
| 7,440,160 B2 | 10/2008 | Heckmeier et al. | |
| 8,179,485 B2 * | 5/2012 | Tsai et al. | 349/33 |
| 8,704,980 B2 * | 4/2014 | Mao et al. | 349/113 |
| 2007/0085970 A1 | 4/2007 | Yoshida | |
| 2007/0242194 A1* | 10/2007 | Jeoung et al. | 349/106 |
| 2012/0257850 A1* | 10/2012 | Fujikata et al. | 385/3 |

FOREIGN PATENT DOCUMENTS

| | | |
|---|---|---|
| EP | 1 688 783 A1 | 8/2006 |
| EP | 1558965 B1 | 7/2008 |
| JP | 2005181746 A | 7/2005 |
| JP | 2005189434 A | 7/2005 |
| KR | 1020050086682 A | 8/2005 |
| WO | 2004046805 A1 | 6/2004 |
| WO | 2009/072563 A1 | 6/2009 |

OTHER PUBLICATIONS

"Active Matrix LCDs," WTEC Hyper-Librarian, Dec. 1994, http://www.wtec.org/loyola/displays/c3_s3.htm.

(Continued)

*Primary Examiner* — Akm Enayet Ullah
(74) *Attorney, Agent, or Firm* — Hackler Daghighian & Martino

(57) ABSTRACT

The invention relates to an electro-optical phase modulator with a plurality of elements arranged between two substrates, which\are produced from an optically isotropic material which becomes optically anisotropic when an electrical field is applied, wherein for each of the elements respectively one electrode is arranged on both substrates and the electrodes can be individually controlled at least on one of the substrates.

4 Claims, 3 Drawing Sheets

(56) References Cited

OTHER PUBLICATIONS

Seow-Hwang Eng, "Optimization of Liquid-Crystal Spatial Light Modulator for Precise Phase Generation," Proceedings of Conference on Optoelectronic and Microelectronic Materials and Devices, Dec. 6, 2006, pp. 105-108.

* cited by examiner

ELECTRO-OPTICAL PHASE MODULATOR WITH AN OPTICALLY ISOTROPIC MATERIAL WHICH BECOMES OPTICALLY ANISOTROPIC UNDER AN ELECTRIC FIELD

Optical phase modulators have a multitude of applications in optics. They can be utilized as electrically adjustable lenses or as electro-optical spatial light modulators. Holograms can be restored with spatial light modulators, for example. In this context, phase modulators compared to amplitude modulators have the advantage that they will absorb or reflect none or only very little light, as a result of which a very high optical efficiency can be accomplished.

The optical phase modulators which have been available up to now depend on having to use polarized light, however, to ensure that no double refraction occurs when the light passes through the phase modulator. The classic design of known phase modulators comprises two glass substrates, each of which are provided with a transparent conductive layer as well as an orientation layer, wherein a double-refracting liquid crystal is between the two glass substrates. The tilt angle of the liquid crystal molecules relative to the glass substrate can be adjusted by means of a voltage applied between the electrodes. Light that is not polarized perpendicular or parallel to the longitudinal axis of the liquid crystal molecules is always subjected to double refraction. In order to be able to specifically adjust the phase difference between the light which enters the liquid crystal layer and exits on the other side, it is therefore necessary to use polarized light.

SUMMARY OF THE INVENTION

The object of the present invention is to provide an electro-optical phase modulator which is also suitable for use with non-polarized light.

This object is solved by an electro-optical phase modulator with a multitude of elements arranged between two substrates, where said elements are produced from an optically isotropic material which becomes optically anisotropic when an electrical field is applied, and with electrodes arranged on both substrates, wherein separate electrodes are provided for the individual elements on at least one of the substrates, which can be individually controlled.

By using an electro-optical active material, which is optically isotropic in the de-energized state and the refractive index of which changes when an electrical field is applied such that the refractive index ellipsoid is axisymmetrical to the electrical field, i.e. it becomes optically anisotropic, it is possible to prevent double refraction of non-polarized light as it passes through the modulator. By providing a multitude of such elements made of the electro-optical active material described, the phase modulator can also be used for spatial purposes. It consists of a multitude of cells that can be individually controlled.

In this context, the direction of propagation of the light can correspond essentially at least to the direction of the electrical field between the electrodes.

In a preferred embodiment, the optically isotropic material is a liquid crystal, wherein liquid crystals are particularly suitable in the so-called blue phase. Liquid crystals in the blue phase have significantly lower response times compared to traditional liquid crystals. For this purpose, the blue phase of the liquid crystal can preferably be polymer-stabilized.

Further advantages result, if the electrodes can be controlled by non-linear components which are arranged on the substrates. With these non-linear components, the voltage applied on the cells can be maintained stable even over longer periods. For this purpose a matrix-type arrangement of the components is especially preferred, as it is also used with active matrix liquid crystal displays, for example.

The non-linear components can be thin-film transistors, for example, which preferably have a high optical transmission. The production of thin-film transistors can be very easily integrated into the manufacturing process for the phase modulator. The desired high optical transmission can be accomplished by the use of oxide semiconductors.

The non-linear components can also be diodes, in particular MIM diodes, where MIM stands for metal-insulator-metal."

In addition, the use of transparent substrate materials is also advantageous for undistorted light transmission.

BRIEF DESCRIPTION OF THE DRAWINGS

In the following, the properties and the principle of operation of a phase modulator as taught by the invention are described in detail by means of an embodiment with reference to the enclosed drawing, as follows.

DETAILED DESCRIPTION

Figure 1A:
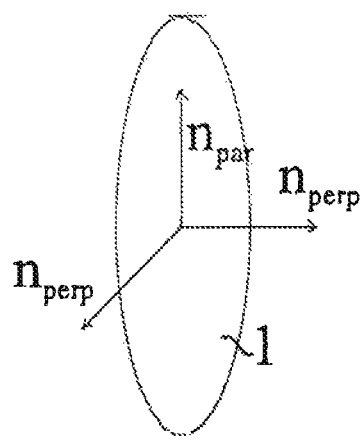
FIG. 1a is a schematic representation of a refractive index ellipsoid of a linear liquid crystal.

FIG. 1a elucidates the refractory indices which are active on a linear liquid crystal 1. It has a refractive index $n_{par}$ for polarized light parallel to its longitudinal axis. For polarized light perpendicular to its longitudinal axis, the refractive index in all directions is $n_{perp}$ however.

Figure 1B:
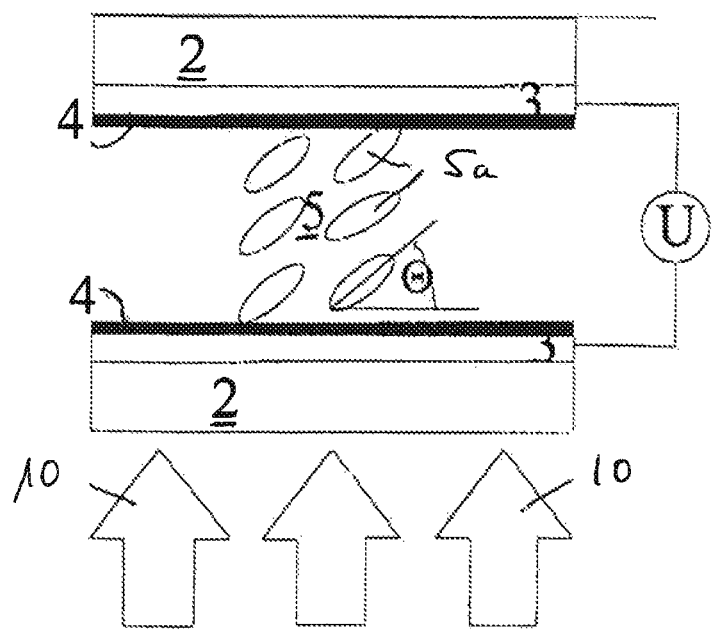
FIG. 1b is a schematic representation of a phase modulator according to prior art.

FIG. 1b shows the structure of a cell of a phase modulator pursuant to prior art, which is schematically represented. Between two glass substrates 2, each of which are provided with a transparent, conductive layer 3 and an orientation layer 4, a double refractive liquid crystal 5 is located, of which some molecules 5a are shown. A voltage U is applied on the electrodes formed between the conductive layers 3. By using this voltage U, the tilt angle theta of the liquid crystal molecules 5a can be adjusted relative to the glass substrates 2. The voltage U on the electrodes 3 is frequently provided by an active matrix (not shown here). Light 10, which is polarized perpendicular to the projection of the longitudinal axis of the liquid crystal molecules 5a onto the glass substrates, is subjected to the refractive index $n_{perp}$. Light, which is polarized parallel to the longitudinal axis of the liquid crystal molecules 5a onto the glass substrates 2, is subjected to a refractive index which depends on the angle theta, which is between $n_{par}$ and $n_{perp}$. On the other hand, light with any other direction of polarization is subjected to double refraction. In order to be able to specifically adjust the phase difference between the light 10 which enters the liquid crystal layer 5 and exits on the other side, it is thus necessary to use polarized light. If absorbing polarizers are used for the polarization of the light, at least 50% of the light is lost.

Figure 2:
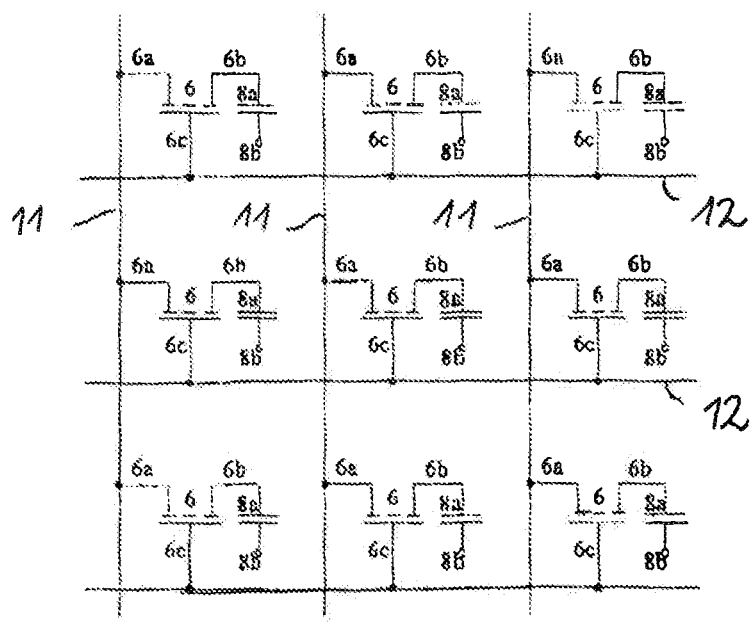
FIG. 2 is a section of a circuit diagram of a phase modulator as taught by the invention.

FIG. 2 shows an electrical circuit diagram of a preferred embodiment of a phase modulator as taught by the invention. Each cell of the phase modulator contains a thin-film transistor 6 that is realized on a first substrate 9a (FIG. 3), the first drain/source electrode 6a of which is connected with a column circuit 11. The second drain/source electrode 6b is connected with an electrode 8a. The gate of the transistor 6 is connected with a row circuit 12. The electrode 8a furthermore has a counter electrode 8b, wherein both electrodes 8a, 8b form a capacitor, so that if a voltage difference exists between electrodes 8a, 8b, an electrical field is created which is essentially oriented perpendicular to the glass substrates 9a, 9b.

Figure 3:
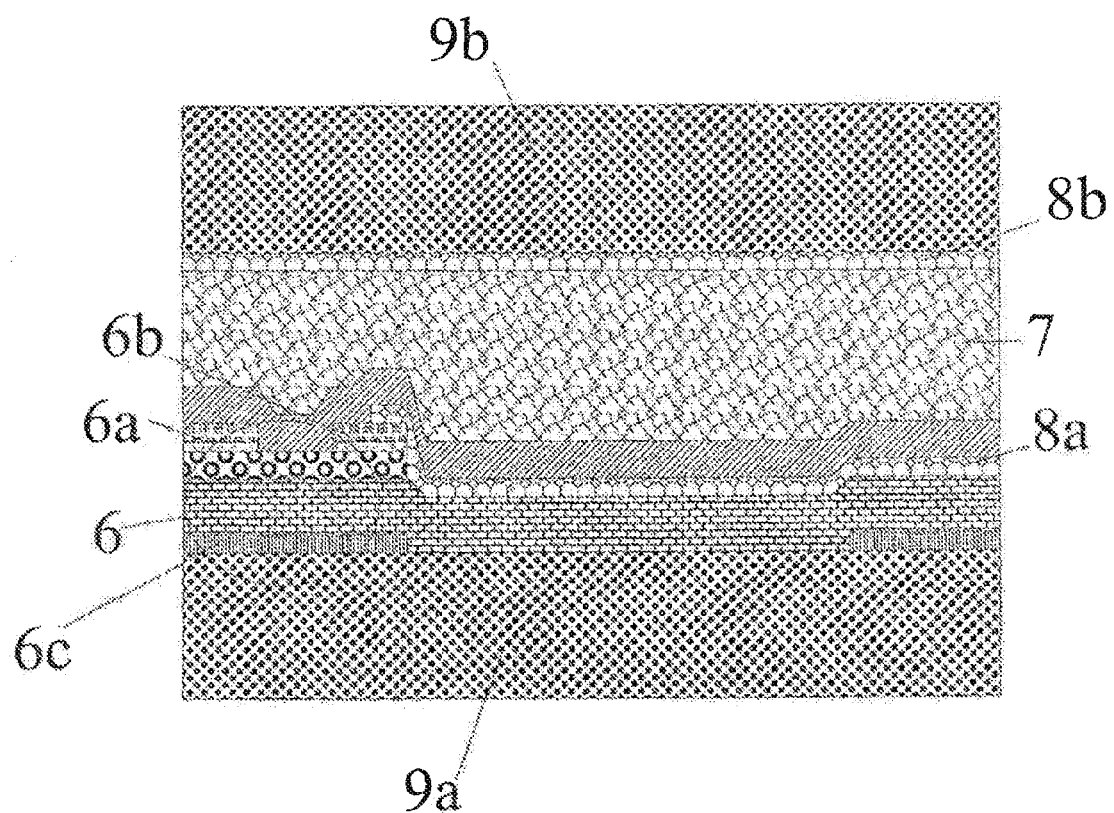
FIG. 3 is a schematic cross-section through an element of the phase modulator from FIG. 2.

As FIG. 3 elucidates, an electro-optically active medium 7, preferably a polymer-stabilized liquid crystal in the blue phase is located between the substrates 9a, 9b. This electro-optical active medium 7 is subjected to a change of the refractive index as a result of the electrical field between the electrodes 8a, 8b, i.e. it becomes optically anisotropic, wherein the developing refractive index ellipsoid is axisymmetrical to the direction of the field. Therefore also non-polarized light can pass through the medium 7 without double refraction. The phase difference between the light entering into the element of the phase modulator and the light which exits the element can therefore be controlled without problems.

What is claimed is:

1. An electro-optical phase modulator with a multitude of cells arranged in rows and columns between two transparent substrates, where said cells are produced from an optically isotropic material which becomes optically anisotropic when an electrical field is applied, wherein separate electrodes are provided for the individual cells on at least one of the substrates, each of which individual cells can be individually controlled by an individual thin-film transistors, each individual thin-film transistor connected to a separate first and second electrode, the first electrode being connected to at least one column circuit from a plurality of column circuits and the second electrode being connected to at least one row circuit from a plurality of row circuits, and wherein the direction of propagation of the light essentially corresponds at least with the direction of the electrical field between the electrodes.

2. The electro-optical phase modulator according to claim 1, wherein the optically isotropic material is a liquid crystal.

3. The electro-optical phase modulator according to claim 2, wherein the material is a liquid crystal in the blue phase, wherein the blue phase is polymer-stabilized.

4. The electro-optical phase modulator according to claim 1, wherein the thin-film transistors have a high optical transmission.

* * * * *